United States Patent [19]

Frankenberger, Jr. et al.

[11] Patent Number: 4,861,482
[45] Date of Patent: Aug. 29, 1989

[54] SELENIUM DETOXIFICATION

[76] Inventors: William Frankenberger, Jr., 109 Masters Ave., Riverside, Calif. 92507; Ulrich Karlson, 3473 Avocado St., Riverside, Calif. 92507-3933

[21] Appl. No.: 227,229

[22] Filed: Aug. 2, 1988

[51] Int. Cl.$^4$ .................................................. C02F 3/34
[52] U.S. Cl. ...................................... 210/611; 210/631; 210/747; 210/912; 435/264; 405/264
[58] Field of Search ............... 210/912, 914, 610, 611, 210/631, 747; 435/264, 267; 134/26, 42; 405/263, 264

[56] References Cited

U.S. PATENT DOCUMENTS

| | | | |
|---|---|---|---|
| 4,519,912 | 5/1985 | Kauffman et al. | 210/912 X |
| 4,519,913 | 5/1985 | Baldwin et al. | 210/912 X |
| 4,522,723 | 6/1985 | Kauffman et al. | 210/912 X |
| 4,725,357 | 2/1988 | Downing et al. | 210/912 X |
| 4,728,427 | 3/1988 | Revis et al. | 210/914 X |

*Primary Examiner*—Tom Wyse
*Attorney, Agent, or Firm*—Nilsson, Robbins, Dalgarn, Berliner, Carson & Wurst

[57] ABSTRACT

A method is provided for the removal of selenium from soil or drain water, which comprises adding to the soil one or more members of the group consisting of pectin, corn straw, starch, galacturonic acid, cellobiose, glucuronic acid, glucose, albumin, casein, gluten, methionine, ethionine, and cobalt, zinc or nickel ions to form volatile alkylselenides.

12 Claims, No Drawings

SELENIUM DETOXIFICATION

FIELD OF THE INVENTION

This invention relates to the fields of agriculture and soil biochemistry, and more particularly to methods for the detoxification of seleniferous soils.

BACKGROUND AND SUMMARY OF THE INVENTION

Selenium is a non-metallic trace element of the sulfur group that is essential in the human diet in small concentrations. However, high concentrations of selenium have accumulated in the top soil in many areas as a result of intense irrigation agriculture. Seleniferous soils have been identified throughout California and the world in areas which are often associated with the saline drainage waters. For example, selenium contamination in the Kesterson Reservoir in California has been attributed to irrigation of nearby farms, and has reached such proportions that it has killed hundreds of water fowl and poisoned livestock. Many creatures which survived have suffered reproductive failure and birth defects as a result of selenium contamination.

Methods to detoxify selenium contaminated soils are presently limited to gathering the contaminated soil and burying it in costly, impervious plastic liners. Often high selenium concentrations are found in ponds or reservoirs, and environmental officials presently are planning to dry the ponds, scrape away the top foot of contaminated mud, and remove it to an isolated land fill.

Evaporation ponds have been widely used in the San Joaquin Valley of California for disposal of agricultural subsurface drainage water. However, selenium concentrations in some of these ponds have now reached hazardous levels in excess of 1000 $\mu$g/L, which is defined in Title 22 of the California Administrative Code as hazardous waste for selenium. Hazardous wastes, according to Subchapter 15 of Title 23, must be disposed in double-lined ponds with leachate collector systems. These ponds are very expensive with reported costs as high as $200,000 per acre to construct. Since selenium is a powerful poison in small amounts, and causes gross birth deformities in both fowl and mammals, it has been a desideratum to provide a safe and effective method for the detoxification of seleniferous soils rather than to merely remove these soils to designated land fills where the potential of significant damage to the environment remains.

It is known that soils naturally contain microbes which are capable of very slowly transforming non-volatile selenium compounds into volatile compounds which are relatively non-toxic and which readily dissipate in the atmosphere. These microbes are naturally occurring and may include fungi, bacteria or certain algae. This transformation is an important link in the global cycle of the element and may have maintained the non-volatile selenium compounds at safe levels in the soil prior to the intense irrigation procedures which have exceeded the cycle's ability to maintain safe selenium levels.

We have discovered a method for greatly increasing the rate of volatilization of selenium from non-volatile selenium compounds which accelerates the transformation of toxic selenium compounds into volatile products to a rate which permits the detoxification of soil or water in situ. This method comprises exposing the non-volatile selenium compound to microbes which are capable of converting the selenium in the non-volatile selenium compound to a volatile alkylselenide, while the microbe is in the presence of one or more members of the group consisting of organic carbon sources such as proteins, amino acids or carbohydrates which enhance alkylation. Preferably, the process is conducted in the further presence of metal ions which enhance alkylation, such as cobalt, zinc and nickel, the non-volatile selenium compound is exposed to the microbes, the carbon source and the metal ions in a medium, for example, soil or water, which facilitates mixing of the components and the desired reaction.

Specifically, the non-volatile selenium compound is exposed to the microbes in the presence of one or more of the members of the group consisting of pectin, straw, starch, galacturonic acid, cellobiose, glucuronic acid, glucose, albumin, casein, gluten, methionine, and ethionine; preferably along with cobalt, zinc or nickel ions.

Albumin, casein, gluten, pectin, methionine, and ethionine are employed in an aerobic soil environment alone or in combination with cobalt, zinc or nickel ions. Preferably, moisture is maintained to the soil, most preferably at field capacity, to optimize the microbial alkylation process.

Preferably pectin, straw, starch, galacturonic acid, cellobiose, glucuronic acid, glucose, albumin, casein or gluten are included in amounts which afford at least 0.01 g carbon per kilogram of soil, and most preferably from 0.01 g to 100 g C/kg soil. The methionine or ethionine are included in amounts which afford at least 0.01 mg carbon per kilogram of soil, and most preferably from 0.01 mg to 200 g C/kg soil. The cobalt, zinc or nickel ions are included in amounts which afford at least 0.01 mg metal per kilogram of soil, and most preferably from 0.01 mg to 2000 mg metal/kg soil.

DETAILED DESCRIPTION OF THE PREFERRED EMBODIMENT

As is set forth above, we have discovered that the natural conversion of non-volatile selenium compounds, principally toxic inorganic selenates, selenites and elemental selenium and certain amino acids wherein selenium has substituted for sulfur (seleno-proteins), may be significantly increased through the addition of a protein carbon source, preferably albumin, casein, gluten, methionine, ethionine to a soil which contains the toxic selenium compounds and the alkylating microbes. The addition of these proteins yields a 4 to 5-fold improvement in the detoxification of the soil, which is a volatilization rate which is sufficient to detoxify topsoil or the upper soil portion of a drained pond or reservoir within a practical period of time, at a significantly lower cost than conventional methods. The use of cobalt, zinc or nickel ions, which aid in the catalysis of the microbial alkylation process, provides an increase in the volatilization rate of at least 2½ times and, when used in combination with a carbon or protein source described above and in the presence of adequate moisture, can provide a volatilization rate of about 10 times that of normal alkylation.

In large scale use of the method, it will be preferred to initiate detoxification in the spring or summer months of the year. The contaminated soil is preferably disked or tilled to a depth of about 6 inches to open pores and promote aeration of the seleniferous soil. A waste material carbon source such as citrus peels (or other waste materials containing pectin) or cattle manure may then be added in a quantity of from 10 to 30 tons per acre. Preferably, pectin and/or a protein such as albumin, casein, gluten (in amounts of from about 0.5 to 1.5 tons per acre) and/or methionine or ethionine (in amounts of from about 50 to 100 pounds per acre) is incorporated into the soil. Metal ions (cobalt, nickel or zinc) may then be added in amounts of at least 25 pounds per acre to accelerate the volatilization of the selenium. If desired, nitrogen fertilizer may be added (up to 50 pounds per acre) which has been shown to provide a significant increase in volatilization when used in combination with protein or carbohydrate amendments.

Preferably, the soil is irrigated frequently, for example, with sprinklers. This irrigation is performed at short intervals to moisten only the upper few centimeters of soil to an optimum moisture content of about $-33$ kPa (2.5 pF).

The soil is then tilled periodically, for example, two times a month to further aerate the soil. Additional carbon amendments are then made to maintain the volatilization process. As set forth in the examples below, this repeated application of the carbon source is generally made in the field about once every 90 days.

With respect to the removal of selenium from drain water, an in situ treatment process has been developed that can be initiated and maintained, avoiding the need for costly centralized facilities and qualified operating personnel. This method involves the addition to the water of a protein or carbon source, as described herein, preferably casein at 0.2 to 20,000 ppm (mg/L), and aerating the water to promote oxygenated conditions which promote the volatilization of Se. Aeration could be supplied by diffuser tubes or vigorous mixing. Mechanical aerators commonly used in water and wastewater treatment include spray, cascade, multiple-tray, diffuse air, rotating brush, surface and submerged turbine type and aspirator types.

EXAMPLE I

Volatile alkylselenide production in soil was measured using labeled Se, activated carbon traps and a continuous flow system. The soils used throughout this example were air-dried surface samples (0 to 15 cm depth) of Los Baños clay loam (fine montmorillonitic, thermic Typic Haploxeralf), Panoche clay loam (fineloamy, mixed, thermic Type Haplargid), and Ciervo clay (fine montmorillonitic, calcareous, thermic Typic Torriorthent) that had been collected from Se-problem areas. These soils were tested for potential for Se alkylation in comparison to Altamont clay, Fallbrook sandy clay loam, Ramona sandy clay loam, Redding clay, and Santa Lucia clay, which represented non-seleniferous sites. Ten g soil samples were maintained at approximately $-33$ kPa (2.5 pF) and incubated at room temperature.

Selenium was added as $Na_2SeO_3$ or $Na_2SeO_4$ at 0.01 to 1000 mg/kg soil, with a label activity of 0.5 mCi/kg soil. The speciation of the two labels was tested by paper chromatography. The fraction of $^{75}Se(IV)$ in the $^{75}Se(VI)$ label was $<0.05\%$ and that of $^{75}Se(VI)$ in the $^{75}Se(IV)$ label was $<9.5\%$ of the total $^{75}Se$. All experimentation was performed in triplicate. Blanks were included for background determination. Trapping of the volatile alkylselenides (dimethyl selenide and dimethyl diselenide) began immediately after application of Se. Traps were sampled at 3.5-day intervals.

To study the effect of carbohydrates on Se alkylation, dissolved pectin was added to the respective samples at 2 g C equivalent/kg soil. Pectin applications were repeated every 35 to 45 days, when alkylselanide production had levelled off.

Three microorganisms capable of producing alkylselenides were isolated from Los Baños and Panoche soil by enrichment for Se tolerance, and measuring DMSe in the head space of stoppered liquid cultures using a gas chromatographic method. The organisms were identified as *Acremonium falciforme, Penicillium citrinum* and *Ulocladium tuberculatum*. Autoclaved and non-sterile samples of Los Baños soil were spiked with 100 mg/kg of labeled Se(IV), inoculated with spores from the fungal isolates ($1.6 \times 10^9$ CFU/kg soil) and incubated as described above.

Comparing the Se volatilization potential of 9 California soils showed that 4 soils from a Se-problem area were among the 5 most active soils. Los Baños, by far the strongest volatilizer, had the lowest native Se content and a relatively high organic C content. Ciervo, the weakest volatilizer out of the 4 Se-affected soils, had a relatively high native Se content and the lowest organic C content. Santa Lucia, the only non-seleniferous soil with a substantial volatilization potential, had by far the highest organic carbon content (26.1 g/kg) of all 9 soils.

Application of *A. falciforme* to autoclaved soil restored almost ⅔ of its native Se volatilization capacity. A similar effect, but to a lesser extent, was observed with *P. citrinum* and *U. tuberculatum*. After inoculation of either one of the three isolates to non-sterile soil, an approximately 1.4-fold increase of the native alkylselenide production rate was observed.

Volatilization rates for added Se(IV) and Se(VI) were highly dependent on the level of Se substrate. In both cases, the highest rates (expressed in % of the added Se volatilized) were often observed with the lowest Se addition. For Los Baños, e.g., the average daily Se evolution was 0.35% at 5 mg Se(IV)/kg and 0.03% at 1000 mg Se(IV)/kg. Alkylselenide production was substantially lower with Se(VI) as a substrate, than with Se(IV). Los Baños only volatilized 0.13% of the added Se(VI) per day at 5 mg/kg. Similar relationships were observed with the other soils, except that they generally showed lower Se evolution rates.

By amending Los Baños soil with a carbon source (i.e., pectin), this observed relationship between Se level and volatilization rates was reversed. Over a period of 118 days the average daily volatilization was 0.2% with 0.01 mg Se(IV)/kg soil, and 0.44% with 25 mg Se(IV)/kg soil. This reversal was not observed with the low producing Ciervo soil. Panoche soil, which was the intermediate producer in the experiments without carbohydrate amendment, had its highest volatilization percentages (0.38%/day) at 0.2 mg Se(IV)/kg, with lower rates at higher and lower Se(IV) levels. Similarly, using Se(VI) instead of Se(IV), the strongest relative volatilization potential was observed at 1 and 0.2 mg Se(VI)/kg in Los Baños and Panoche, respectively, and at 0.04 mg Se(VI)/kg in Ciervo.

Pectin amendments greatly accelerated volatilization rates in all cases. The addition of pectin narrowed the gap in Se evolution rates between the different soils. At 5 mg Se(VI)/kg soil without C, 4.0%, 0.3% and 0.04% of the added Se evolved from Los Baños, Panoche and Ciervo in 30 days, while 16.5%, 9.2% and 5.3% was detected with pectin respectively. The acceleration was most pronounced with Se(VI) as the Se source, to the effect that the rate differences in volatilization of Se(IV) versus Se(VI) almost disappeared upon the addition of pectin. During the first 30 days, the average daily emanation of Se at 5 mg Se/kg of Panoche soil without pectin was 0.08% with Se(IV) and 0.01% with Se(VI); pectin addition increased these respective values to 0.34% for Se(IV) and 0.30% for Se(VI). The rate increasing effect disappeared within 35 to 45 days; however, was observed again upon repeated pectin additions in most treatments. The response to repeated pectin additions was stronger for the higher Se levels. In particular with Se(VI) as the substrate, the rates following carbohydrate reload were higher than the initial rates.

Comparing average volatilization for the first 30 days, pectin addition increased the rates from 1.8-fold to 4.4-fold using Se(IV) and from 2.0-fold to 167.7-fold using Se(VI). As a result of these dramatic rate increases, between 11.3 and 51.4% of the added Se evolved within a period of 118 days, with a total of 3 pectin applications. The highest Se recovery through volatilization in the presence of Se(VI) was 23.0% for Ciervo soil at 0.04 mg/kg, 42.6% for Panoche at 0.2 mg/kg, and 42.9% for Los Baños at 1 mg/kg. Upon addition of Se(IV), recovery of alkylselenides was as high as 24.4% for Ciervo at 0.01 mg/kg, 44.6% for Panoche at 0.2 mg/kg, and 51.4% for Los Baños at 25 mg/kg.

The observation that pectin amendments accelerated alkylselenide production among soils, is an indicator that carbon is the major limiting factor. While the methylation pathway is uncertain, it is known that it involves reduction of Se and transfer of carbon groups, hence requires energy at the expense of carbon. The importance of a carbon supply was evidenced by the rapid experimental disappearance of the amendments. The extent to which pectin addition canceled the difference between Se(IV) and Se(VI) substrate provides indirect information on the pathway of Se alkylation. Apparently, Se(VI) is first reduced to Se(IV). Providing Se(IV) instead of Se(VI) would eliminate the need for this step, hence save a substantial amount of energy. Without a carbon supply, the reduction step from Se(VI) to Se(IV) is the rate limiting step of the transformation. When the carbon supply is being supplemented, this step can proceed rapidly, using the carbohydrate as an energy source. The rate limiting reaction is then further down in the pathway. Even with amendments, cumulative volatilization was consistently 5 to 15% lower with Se(VI). This may reflect the energy spent for the reduction step, consuming a part of the carbon supply and making it unavailable for the remainder of the process.

The addition of pectin accelerated the evolution of volatile selenium compounds up to 167.7 fold. With three pectin additions over a period of 118 days, total selenium volatilization amounted to up to 51.4% of the added selenium.

This first example describes the transformation of non-volatile selenium compounds, such as are commonly found in selenium contaminated soils, to volatile alkylselenides which evaporate from the soil sample and are trapped by activated carbon. The selenium in the volatile alkylselenides, which have been found to be dimethyl selenide or dimethyl diselenide, was measured by counting the recovered $^{75}$Se in the carbon traps. While a wide variety of microbes may be capable of transforming the non-volatile selenium compounds into volatile alkylselenides, particular fungi isolates from these soils enhanced selenium evolution in both non-sterile and autoclaved soils after inoculation with fungi. The addition of carbon in the form of a carbohydrate, preferably pectin, increased the selenium evolution up to 167.7-fold. A minimum selenium threshold for alkylselenide production was not detected, and selenium levels as low as 100 micrograms/kg of soil were found to produce volatile selenide compounds.

EXAMLE II

In a second example, additional soil amendments produced further increases in the rate of volatilization of selenium contaminated soil. Alkylselenide production from contaminated soil was again measured using $^{75}$Se-labeled $Na_2SeO_3$, activated carbon traps and the continuous flow system. Los Baños clay loam (fine montmorillonitic, thermic Typic aploxeralf) was chosen as a representative of Se-affected soils collected from the Panoche fan, San Joaquin Valley, California. The natural Se content of this soil allowed experimental addition of labeled Se to simulate artificial Se levels as encountered at various Se-contaminated sites throughout California. Soil properties were determined as pH, 7.96; organic C, 9.67 g/kg; total N, 0.957 g/kg; total Se, 0.216 mg/kg; moisture content at $-33$ kPa, 0.452 L/kg; 36.9% clay; 20.3% sand.

Ten-g soil samples were maintained at approximately $-33$ kPa (2.5 pF) and incubated at room temperature. Selenium was added as labeled $Na_2SeO_3$ at 100 mg/kg soil, with a specific activity of 185 GBq/kg Se. The speciation of non-labeled Se was confirmed by single-column ion chromatography and that of $^{75}$Se by paper chromatography. The fraction of Se(IV) was >99% in both cases. Several types of carbon amendments were applied at 2 g C/kg soil, and included defined reagent grade materials, as well as organic wastes that had been air-dried and ground (<1 mm). The C content of the defined organic compounds were dissolved in $H_2O$ and added with $Na_2SeO_3$ solution, otherwise, they were mixed in dry. Nitrogen was applied as $KNO_3$ solution as 0.1, 0.2 and 0.4 g/kg soil. Trace elements were analytical grade sodium or chloride salts ($Na_2HAsO_4.7H_2O$; $Na_2B_4O_7.10H_2O$; $CdCl_2.2\frac{1}{2}H_2O$; $Na_2Cr_2O_7.2H_2O$; $CoCl_2.6H_2O$; $HgCl_2$; $MnCl_2.4H_2O$; $NaMoO_4.2H_2O$; $NiCl_2.6H_2O$; $PbCl_2$; $ZnCl_2$), and were added at 5 and 25 mmol/kg soil. All experimentation was performed in triplicate. Blanks were included for background determination. Trapping of alkylselenides began immediately after application of Se. Traps were sampled at intervals between 1 and 4 days for up to 37 days and counted directly in a gamma counter. Counts were converted to percent of $^{75}$Se volatilized by computation with internal standards. Data were averaged and cumulative values were plotted. Extraction of traps and GC/MS analysis of the extracts confirmed that the volatile products were mainly DMSe and smaller quantities of DMDSe.

The unamended soil volatilized 2.90% of the added Se in 13 days. All C compounds simulated alkylselenide production, but to various degrees. With cellulose, Se evolution totaled 3.27% (1.13-fold increase compared to the unamended soil) while with pectin it was 8.77% (3.02-fold increase) and with galacturonic acid, 6.87% (2.37-fold increase). Starch provided an Se evolution of about 4.6%, glucose about 4.3%, cellobiose about 5.9%, and glucuronic acid about 4.3%.

When using organic wastes, strong simulation was observed with cowpea leaves (2.56-fold) and corn leaves (2.27-fold). With San Carlos sewage sludge no effect was observed, while 9.8% inhibition occurred with Hayward sewage sludge. Overall production was also reduced by 11.6% with feedlo: manure.

Application of 0.1 g/kg N combined with galacturonic acid (C/N of the amendment =20) increased volatilization rates approximately 1.9-fold over the carbon-only amendment, but only during the first week. Overall, Se volatilization after 37 days was increased 1.23-fold at C/N =20, 1.08-fold at C/N =10, and decreased by 11.8% at C/N =5. Without C amendments, N had little effect at the lower N level but at higher N levels there was an overall inhibition of 24.3%.

When incorporated with galacturonic acid, volatilization of Se was slightly inhibited (12.7%) with addition of 5 mmol/kg Co, while 5 mmol/kg Ni had no effect and 5 mmol/kg Zn enhanced Se evolution 1.27-fold after 37 days. After a lag period of approximately 3 days, applications of 25 mmol/kg of either element resulted in dramatically increased volatilization rates, which were sustained for approximately 2 weeks. After 3 weeks the rates had leveled off and were comparable to the C-only amendment. Repeated C application at that point prompted volatilization rates to increase again, but not to the extent as observed after 7 days. Total volatilization over the first 21 days was increased 2.49-fold with 25 mmol/kg Co, 1.67-fold with 25 mmol/kg Zn, and 1.46-fold with 25 mmol/kg Ni, as compared to the C-only amendment. Over 37 days and with two C amendments, the volatilization potential (Se removal) was 34, 30 and 23% with Co, Zn and Ni, respectively.

Other trace elements inhibited alkylselenide production, except for 5 mmol/kg As, which slightly stimulated this transformation during the first 10 days. With Cr at 5 mmol/kg, volatilization rates picked up slightly after 10 days, but overall inhibition was 72.2%. Among the other trace elements at the 5 mmol/kg level, overall inhibition was 3.6% for B, 3.9% for Cd, 11.8% for Mn, 22.8% for Pb, 33.3% for Mo, and 94.5% for Hg. At 25 mmol/kg the same pattern was observed, except that as inhibited (28.3%) this reaction more strongly than B (19.1%). Lead, Cr and Hg were among the stronger inhibitors (83.7%, 70.0%, and 99.4%, respectively).

Of the C amendments tested in Examples I and II, pectin caused by far the strongest stimulation of alkylselenide production. Galacturonic acid, the monomer of pectin, was almost as effective. Pectin may be more effective due to its partially methylated structure, which possibly provides a source for direct transfer of free methyl groups from the carbohydrate to the microbial transmethylation pathway. Cellulose, which is degraded by very few microorganisms because of its long-chain structure, produced only a minor rate increase, while its dimer, cellobiose, was more readily available for the volatilizing organisms. The effect of rapid depletion of the added C source was evident in these experiments. After the second week, C was limiting and volatilization rates were similar to the no-C control. Repeated C amendments triggered the methylation reaction again.

The negligible inhibitory effects of the sewage sludges may be partially attributed to high trace element content. San Carlos and Hayward sludge contained 560 and 1155 mg/kg of Cr, respectively. The Pb content of this sludge was 1015 and 1715 mg/kg, respectively. Metal toxicity may have outweighed the benefits of organic amendments.

Further studies were made on various soil samples using the apparatus and methodology described in examples 1 and 2. The addition of albumin, casein, gluten, pectin, methionine or ethionine in amounts of 2 grams carbon per kilogram of soil, either alone or in combination with cobalt, zinc or nickel ions in amounts of about 50 pounds per acre, increased the volatilization of dimethyl selenide and dimethyl diselenide in excess of the best results obtained above through the use of pectin. A smmary of the results obtained from various soils from the addition of carbon sources and metals is shown in the Table.

From the foregoing description, one skilled in the art can readily ascertain that essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

| Fold Increase (Decrease) | Experimental Condition | Incubation (days) | Amendment |
|---|---|---|---|
| 167.7 | Ciervo Soil 1 mg Se(VI)/kg | 30 | Pectin 2.0 g C/kg soil |
| 131.4 | Ciervo Soil 5 mg Se(VI)/kg | 30 | Pectin 2.0 g C/kg soil |
| 78.3 | Ciervo Soil 25 mg Se(VI)/kg | 30 | Pectin 2.0 g C/kg soil |
| 6.02 | Los Baños Soil 100 mg Se(IV)/kg | 21 | Galacturonic Acid 2.0 g C/kg soil + 25 mmol Co/kg soil |
| 5.00 | Los Baños Soil 100 mg Se(IV)/kg | 37 | Galacturtonic Acid 2.0 g C/kg soil + 25 mmol Co/kg soil* |
| 4.39 | Los Baños Soil 100 mg Se(IV)/kg | 37 | Galacturonic Acid 2.0 g C/kg soil + 25 mmol Zn/kg soil |
| 4.2 | Los Baños Soil 5 mg Se(VI)/kg | 30 | Pectin 2.0 g C/kg soil |
| 4.04 | Los Baños Soil 100 mg Se(IV)/kg | 21 | Galacturonic Acid 2.0 g C/kg soil + 25 mmol Zn/kg soil |
| 3.6 | Los Baños Soil 25 mg Se(VI)/kg | 30 | Pectin 2.0 g C/kg soil |
| 3.53 | Los Baños Soil 100 mg Se(IV)/kg | 21 | Galacturonic Acid 2.0 g C/kg soil + 25 mmol Ni/kg soil |
| 3.34 | Los Baños Soil 100 mg Se(IV)/kg | 21 | Galacturonic Acid 2.0 g C/kg soil + 5 mmol Zn/kg soil |
| 3.29 | Los Baños Soil 100 mg Se(IV)/kg | 37 | Galacturonic Acid 2.0 g C/kg soil + 25 mmol Ni/kg soil* |
| 3.2 | Los Baños Soil 1 mg Se(VI)/kg | 30 | Pectin 2.0 g C/kg soil |
| 2.42 | Los Baños Soil 100 mg Se(IV)/kg | 21 | Galacturonic Acid 2.0 g C/kg soil |
| 5.85 | Kesterson Pond | 5 | Albumin 2.0 g C/kg soil |
| 3.73 | Kesterson Pond | 5 | Ethionine 0.2 g C/kg soil |
| 3.73 | Kesterson Pond | 5 | Gluten 2.0 g C/kg soil |
| 3.65 | Kesterson Pond | 5 | Methionine 0.2 g C/kg soil |
| 3.23 | Kesterson Pond | 5 | Casein 2.0 g C/kg soil |
| 2.68 | Kesterson Pond | 5 | Galacturonic Acid 2.0 g C/kg soil |
| 1.92 | Kesterson Pond | 5 | Yeast Extract 2.0 g C/kg soil |
| 1.75 | Kesterson Pond | 5 | Cellobiose 2.0 g C/kg soil |
| 1.20 | Kesterson Pond | 5 | Chitin 2.0 g C/kg soil |

-continued

OBSERVED INCREASES IN SELENIUM VOLATILIZATION

| Fold Increase (Decrease) | Experimental Condition | Incubation (days) | Amendment |
|---|---|---|---|
| 1.18 | Kesterson Pond | 5 | Fucose 2.0 g C/kg soil |
| 1.12 | Kesterson Pond | 5 | Ramnose 2.0 g C/kg soil |
| 1.02 | Kesterson Pond | 5 | Starch 2.0 g C/kg soil |
| 1.02 | Kesterson Pond | 5 | Cellulose 2.0 g C/kg soil |
| (2.14) | Kesterson Pond | 5 | Feedlot Manure 2.0 g C/kg soil |

*Including a second application on day 21 of Galacturonic Acid (2.0 g C/kg soil).

We claim:

1. A method for increasing the rate of volatilization of selenium from a non-volatile selenium compound, which comprises exposing the non-volatile selenium compound, in a solid medium, to microbes which are capable of converting the selenium to a volatile alkylselenide, and adding to the medium a carbon source which enhances alkylation selected from the group consisting of proteins, carbohydrates and mixtures thereof, alone or in combination with at least one metal ion selected from the group consisting of cobalt, zinc and nickel.

2. A method for increasing the rate of volatilization of selenium from a non-volatile selenium compound, in a solid medium, to microbes which are capable of converting the selenium to a volatile alkylselenide, while the microbes are in the presence of a carbon source which enhances alkylation selected from the group consisting of proteins, carbohydrates and mixtures thereof, alone or in combination with at least one metal ion selected from the group consisting of cobalt, zinc and nickel.

3. The method of claim 1 or 2 wherein the microbes are selected from the group consisting of *Acremonium falciforme, Penicillium citrinum* and *Ulocladium tuberculatum*.

4. The method of claim 1 or 2, wherein the carbon source is selected from the group consisting of pectin, straw, starch, galacturonic acid, celloboise, glucuronic acid, glucose, albumin, casein, gluten and mixtures thereof.

5. The method of claim 1 or 2, wherein the carbon source is present in an amount sufficient to provide from about 0.01 to about 100 g carbon/kg solid medium.

6. The method of claim 1 or 2, wherein said at least one metal ion is present in an amount sufficient to provide from about 0.01 mg to about 2000 mg metal/kg solid medium.

7. A method for the removal of non-volatile selenium from a medium comprising soil, which comprises adding to the soil containing microbes which are capable of converting the selenium to a voltatile alkylsenide a carbon source which enhances alkylation selected from the group consisting of proteins, carbohydrates and mixtures thereof, alone or in combination with at least one metal ion selected from the group consisting of cobalt, zinc and nickel.

8. A method for the removal of non-volatile selenium from a medium comprising soil, which comprises adding to the soil microbes which are capable of alkylating the non-volatile selenium to a volatile alkylselenide and a carbon source which enhances alkylation selected from the group consisting of proteins, carbohydrates an mixtures thereof, alone or in combination with at least one metal ion selected from the group consisting of cobalt, zinc and nickel.

9. The method of claim 7 or 8 wherein the microbes are selected from the group consisting of *Acremonium falciforme, Penicillium citrinum* and *Ulocladium tuberculatum*.

10. The method of claim 7 or 8, wherein the carbon source is selected from the group consisting of pectin, straw, starch, galacturonic acid, cellobiose, glucuronic acid, glucose, albumin, casein, gluten and mixtures thereof.

11. The method of claim 7 or 8, wherein the carbon source is present in an amount sufficient to provide form about 0.01 to about 100 g carbon/kg soil.

12. The method of claim 7 or 8, wherein said at least one metal ion is present in an amount sufficient to provided from about 0.01 mg to about 2000 mg metal/kg soil consisting of pectin, straw, starch, galacturonic acid, cellobiose, glucuronic acid, glucose, albumin, casein, gluten and solid medium.

* * * * *